Figure 1:
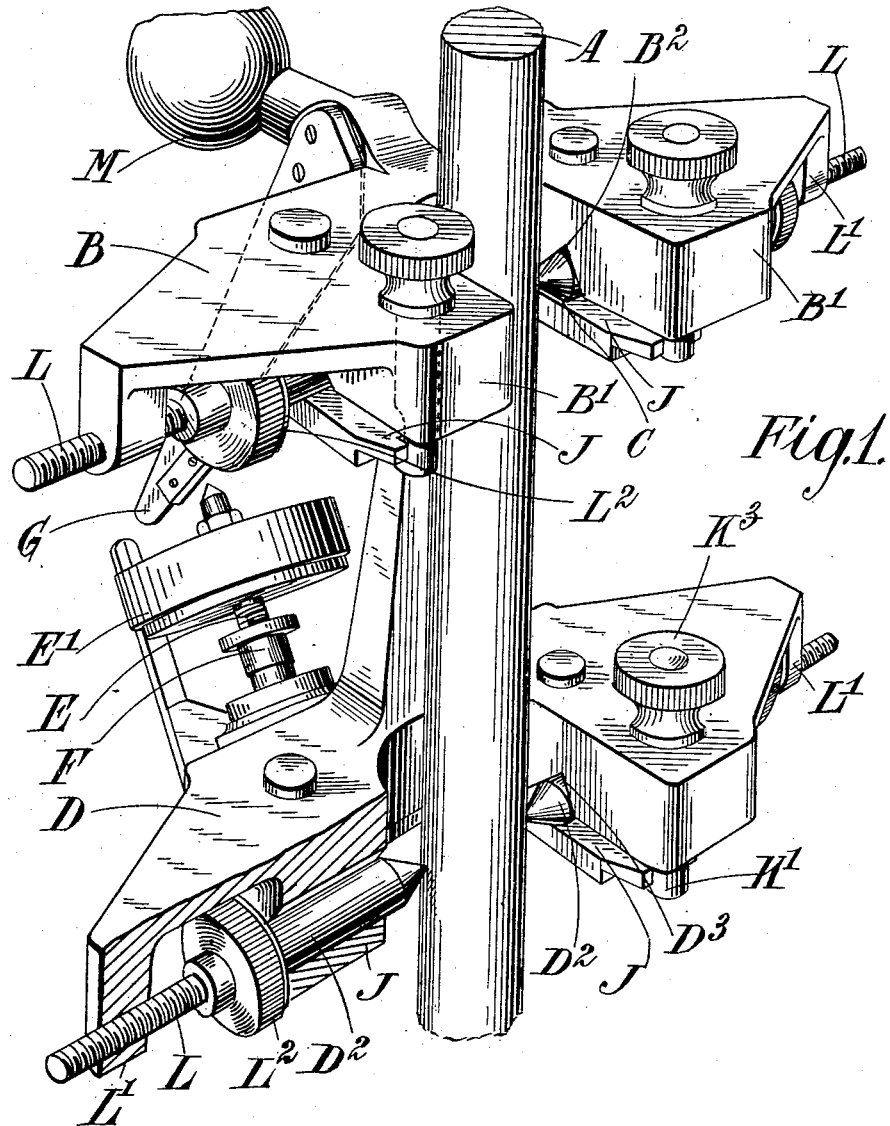

H. DARWIN.
MEASURING INSTRUMENT.
APPLICATION FILED APR. 4, 1908.

910,509.

Patented Jan. 26, 1909.
2 SHEETS—SHEET 1.

H. DARWIN.
MEASURING INSTRUMENT.
APPLICATION FILED APR. 4, 1908.
910,509.
Patented Jan. 26, 1909.
2 SHEETS—SHEET 2.
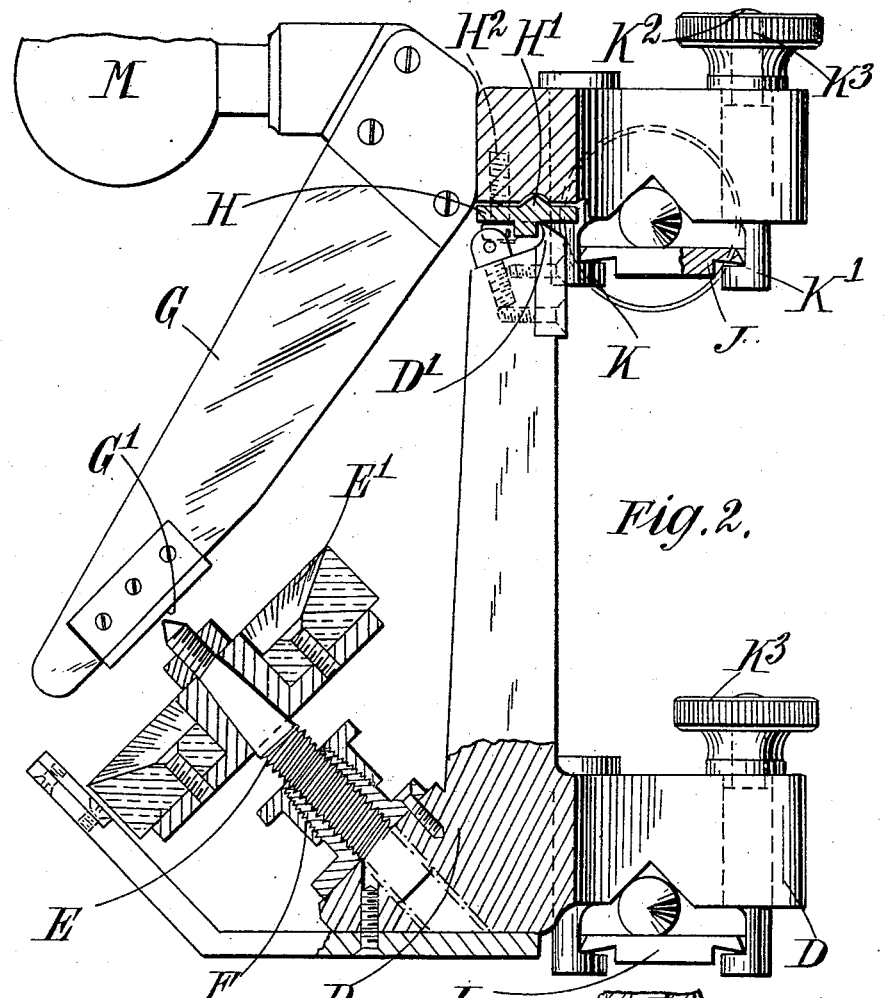
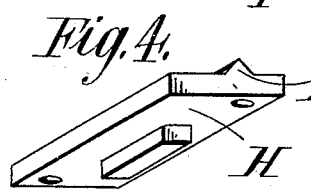
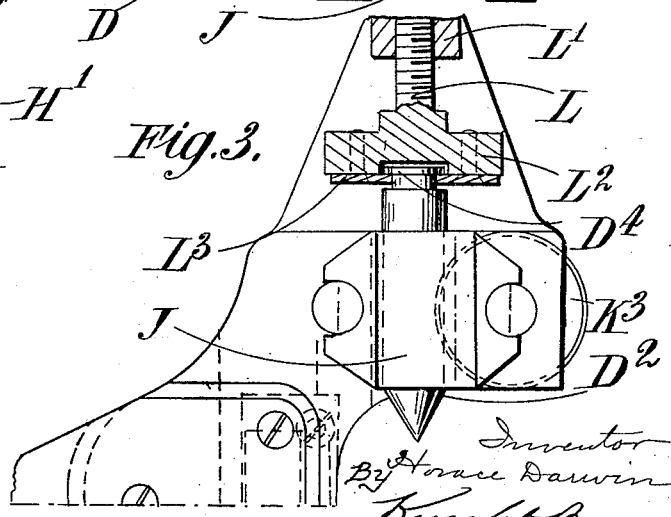

UNITED STATES PATENT OFFICE.

HORACE DARWIN, OF CAMBRIDGE, ENGLAND.

MEASURING INSTRUMENT.

No. 910,509.   Specification of Letters Patent.   Patented Jan. 26, 1909.

Application filed April 4, 1908. Serial No. 425,161.

*To all whom it may concern:*

Be it known that I, HORACE DARWIN, a subject of the King of England, residing at Cambridge, in the county of Cambridge, England, have invented certain new and useful Improvements in Measuring Instruments, of which the following is a specification.

This invention relates to measuring instruments of the type in which micrometric devices are used for the measurement of linear dimensions or of differences or changes of linear dimensions. In such instruments adjustment of the micrometer has to be made in accordance with the linear magnitude which is being measured, and one object of this invention is to provide ready and accurate means for determining the accuracy of such adjustment.

In a measuring instrument according to this invention a tongue or feeler is employed which can vibrate or be moved to and fro across the axis of the micrometer screw, and if the adjustment be correct, the motion is very slightly opposed by the point of the micrometer screw, which gives rise to a sound if the vibration of the tongue be rapid, or may be felt if the tongue be moved gently by hand.

If the motion of the feeler be found to be entirely unopposed, the micrometer may be judged to be too far withdrawn from the feeler. On the other hand, should the micrometer be too close to the feeler, the motion may be entirely prevented or considerably opposed.

The invention also comprises improvements in certain details of construction hereinafter referred to, and illustrated in the drawings.

By way of example the invention will be described as applied to an extensometer, that is an instrument for measuring the elongation of a given length of a piece of material under test under a given load in a testing machine.

Figure 5:
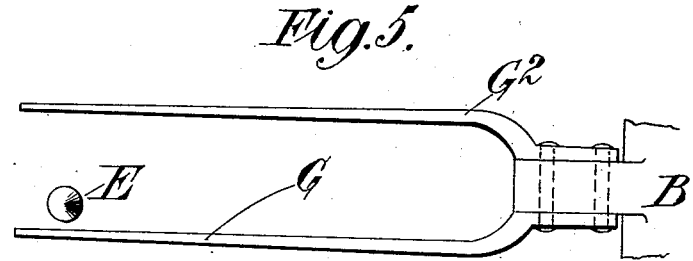

In the accompanying drawings, Figure 1 is a perspective view showing an extensometer according to this invention with a portion broken away for the sake of clearness. Fig. 2 is a central vertical section, Fig. 3 a plan of a portion of the instrument seen from beneath. Fig. 4 is a perspective view of a detail, and Fig. 5 a plan view of a portion of another construction of extensometer also according to this invention.

Like letters indicate like parts throughout the drawings.

With reference first to Figs. 1, 2, 3 and 4, A is a test piece having pivotally engaged with it a member B with forked arms or lugs $B^1$. Engagement between this member and the test piece A is made through the conical ends of center-points C which engage with punch marks or depressions made for them in the test piece. The member B is supported upon a knife edge $D^1$ forming part of a member D pivotally engaged with the test piece through center-points $D^2$ acting in a manner similar to that described with reference to the center-points C in the member B. This member D is provided with a micrometer screw E working in a nut F adjustable to take up any wear or backlash which may occur, and provided with a graduated head $E^1$ coöperating with a reading line on a bracket $E^2$ attached to the member D.

Mounted on the member B is a tongue or feeler in the form of a spring blade G provided with an edge $G^1$ preferably of steel so disposed that if produced it would intersect the knife edge $D^1$. This tongue G can vibrate in a plane at right angles to the axis of the micrometer screw E, but is preferably normally out of alinement with that axis so that any movement of the blade towards the point of the screw is not likely to result in injury to either of those members.

As will be seen by reference to Fig. 2, the member B does not bear directly upon the knife edge $D^1$ but is provided with a plate H which is attached to the member and rests upon the knife edge. This plate H is a rocking plate being provided with a ridge $H^1$ about which it can be rocked slightly by means of adjusting screws; one of these is shown at $H^2$ in Fig. 2, and from the perspective view of the plate shown in Fig. 4 it will be seen that provision is made for two such screws, one on each side of the ridge $H^1$. This adjustment of the plate H on the member B affords a delicate means for altering the relative lengths of the arms of the lever formed by the member B and the blade G, and such alteration can be used for the adjustment of the readings given by the divided head $E^1$ of the micrometer screw E.

In order that the center-points C and $D^2$ may be kept in proper alinement, mechanism is provided by means of which each point may be caused to move towards or away from the test piece without rotation, thus avoiding the introduction of any error due to want of truth in the turning of the points. V-grooves as at B² and D³ are formed to receive the truly worked rods forming the center-points C and D². These are held in their places by plates J, the edges of these plates engaging with recesses in studs K K¹. Each plate has a pair of these studs, the stud K in each case being fixed in the member B or D, but the other stud K¹ being slidable in a hole made to receive it in the member and furnished with a screw portion K² and milled head K³. By loosening the milled head K³, the plate J may be allowed to drop slightly at one side to let the center-point slide in its V-groove, and when that adjustment has been made, the tightening of the nut K³ suffices to clamp the point firmly in place.

The movement of each center-point in its seating is brought about by means of a screw L which engages with a threaded lug L¹ on the member B or D respectively, and is furnished with a head L² having a recess into which the end of the center-point enters, and a plate L³ adapted to engage with a circular recess D⁴ in that point. This construction is shown clearly in Fig. 3 of the drawings, and it will be seen that by rotating the head L² of the screw, the center-point D² is caused to move longitudinally in its groove without rotation.

A weight M serves to keep the plate H resting closely upon the knife edge D¹.

The method of working with the extensometer described is as follows—The test piece A is first suitably indented at two pairs of opposite points so that the extensometer can be attached to it by means of the center-points C and D². The test piece is then placed in a testing machine, and the extensometer attached to it, the micrometer screw E being so adjusted that on moving the blade or feeler G from side to side, or causing it to vibrate rapidly, the presence of the point of the micrometer screw can only just be detected. A reading of the micrometer head E¹ is then taken.

A known load is next applied to the test piece which is thus caused to stretch. In particular, the extension of that part of the test piece which lies between the pairs of center-points C and D² causes the edge G¹ of the blade G and the point of the micrometer screw E to approach one another. The amount of this approach will bear to the extension of the test piece between the two sets of center-points aforesaid, a ratio depending upon the proportioning of the parts of the extensometer. The next step is to readjust the micrometer screw so that on moving the blade G from side to side or vibrating it as before, the contact between the screw point and the blade is once more only barely perceptible. The micrometer head is again read and the difference between the reading now obtained and that obtained before the application of the load, gives a measure of the amount of extension of the test piece.

The head may, of course, be graduated to express directly in terms of some convenient unit the extension of that portion of the test piece which lies between the center-points C and D², or any other convenient and usual arrangement may be adopted.

When dealing with thin or flexible test pieces, there is a tendency for the vibrations of the feeler G to be transmitted to the whole instrument and to the test piece. To obviate or lessen this defect, a vibrating feeler having two tongues somewhat after the fashion of a tuning-fork may be employed. Such a construction is illustrated in plan in Fig. 5, where a second tongue G² is shown connected at its root with the tongue G. In such a form of instrument the parts would be so arranged that only one tongue, for instance the tongue G, vibrates across the axis of the micrometer screw E, the other being out of range and serving only to vibrate with the first tongue and prevent the undesirable transmission of the vibrations to the rest of the instrument.

What I claim as my invention and desire to secure by Letters Patent is—

1. In a measuring instrument the combination of two members adapted to be engaged with the material under test a point or projection carried by one member and a feeler carried by the other member and adapted to move in a plane perpendicular to the axis of such point or projection to determine accurately the relative position of the two members.

2. In a measuring instrument the combination of two members movable relatively to each other, means for measuring the amount of movement between the members and a tongue or feeler attached to one member and adapted to move transversely to the path of motion of the measuring means to indicate by sound the accuracy of the adjustment.

3. In a measuring instrument the combination of two members adapted to be attached to the material under test a micrometer mounted on one of such members and a flexible tongue or feeler carried by the other member and adapted to be vibrated transversely to the axis of the micrometer to indicate by contact the accuracy of its adjustment.

4. In a measuring instrument the combination of a member provided with means for pivotally engaging the material under test, a knife-edge forming part of said member, a second member also adapted to be engaged with the material under test and supported on said knife-edge, a micrometer screw mounted on the first member and a flexible tongue or feeler mounted on the second member so as to be movable across the axis of the micrometer screw.

5. In a measuring instrument the combination of a member, means whereby said member may pivotally engage the material under test, V-grooves formed in said member, center-points slidable in said grooves, means for sliding said center-points in the grooves without rotation and means for clamping them in the grooves.

6. In a measuring instrument the combination of a member adapted to be pivotally engaged with the material under test, V-grooves formed in said member, center-points slidable in said grooves, means for sliding said center-points in the grooves without rotation, means for clamping them in the grooves, a knife-edge forming part of such member, a second member also provided with center-points adapted to be moved in V-grooves without rotation and to be clamped therein, a rocking plate attached to said member and forming a bearing for the knife-edge, and means for rocking said plate to adjust slightly the point at which the second member is supported on the knife-edge.

7. In a measuring instrument the combination of a member adapted to be pivotally engaged with the material under test, V-grooves formed in said member, center-points slidable in said grooves, means for sliding said center-points in the grooves without rotation, means for clamping them in the grooves, a knife-edge forming part of such member, a second member also provided with center-points adapted to be moved in V-grooves without rotation and to be clamped therein, a rocking plate attached to said member and forming a bearing for the knife-edge, means for rocking said plate to adjust slightly the point at which the second member is supported on the knife-edge, a micrometer screw mounted on the first member, a flexible tongue or feeler mounted on the second member so as to move across the axis of the micrometer screw to indicate by sound the accuracy of its adjustment.

8. In a measuring instrument the combination of a member adapted to be pivotally engaged with the material under test, V-grooves formed in said member, center-points slidable in said grooves, means for sliding said center-points in the grooves without rotation, means for clamping them in the grooves, a knife-edge forming part of such member, a second member also provided with center-points adapted to be moved in V-grooves without rotation and to be clamped therein, a rocking plate attached to said member and forming a bearing for the knife-edge, means for rocking said plate to adjust slightly the point at which the second member is supported on the knife-edge, a micrometer screw mounted on the first member, a flexible feeler comprising two tongues mounted on the second member and so disposed that one of said tongues can be moved across the axis of the micrometer screw to indicate by sound the accuracy of its adjustment.

In testimony whereof I have signed my name to this specification in the presence of two subscribing witnesses

HORACE DARWIN.

Witnesses:
 HARRY S. SEIDYL,
 A. J. FRENCH.